(12) United States Patent
Sanford

(10) Patent No.: US 8,369,702 B2
(45) Date of Patent: Feb. 5, 2013

(54) ELECTRONIC DEVICES WITH COMPONENT MOUNTING STRUCTURES

(75) Inventor: Emery Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 12/835,695

(22) Filed: Jul. 13, 2010

(65) Prior Publication Data

US 2012/0014687 A1 Jan. 19, 2012

(51) Int. Cl.
*G03B 17/02* (2006.01)

(52) U.S. Cl. .......................... 396/535; 396/429

(58) Field of Classification Search ............... 396/533, 396/535; 359/829
See application file for complete search history.

(56) References Cited

U.S. PATENT DOCUMENTS

| | | | |
|---|---|---|---|
| 2,074,917 A * | 3/1937 | Kauffman | 337/266 |
| 2,949,595 A * | 8/1960 | Doeleman | 338/70 |
| 3,864,005 A * | 2/1975 | Klein | 439/812 |
| 5,368,503 A * | 11/1994 | Savage, Jr. | 439/502 |
| 5,463,502 A * | 10/1995 | Savage, Jr. | 359/819 |
| 5,474,460 A * | 12/1995 | Tirrell et al. | 439/121 |
| 6,616,480 B2 * | 9/2003 | Kameyama | 439/587 |
| 6,678,589 B2 * | 1/2004 | Robertson et al. | 701/21 |
| 6,843,457 B2 | 1/2005 | Richter | |
| 7,112,083 B2 * | 9/2006 | Nishio et al. | 439/331 |
| 7,128,607 B2 * | 10/2006 | Li | 439/607.36 |
| 7,388,616 B2 * | 6/2008 | Yamazaki | 348/373 |
| 7,727,009 B2 * | 6/2010 | Goto | 439/552 |
| 2005/0248680 A1 | 11/2005 | Humpston | |
| 2007/0103886 A1 * | 5/2007 | Collins | 362/88 |
| 2007/0292127 A1 | 12/2007 | Kuhmann et al. | |
| 2008/0131112 A1 | 6/2008 | Aoki et al. | |
| 2008/0166007 A1 | 7/2008 | Hankey et al. | |
| 2009/0092385 A1 * | 4/2009 | Cullen et al. | 396/25 |

* cited by examiner

*Primary Examiner* — Clayton E Laballe
*Assistant Examiner* — Leon W Rhodes, Jr.
(74) *Attorney, Agent, or Firm* — Treyz Law Group; G. Victor Treyz; David C. Kellogg

(57) ABSTRACT

Electronic devices are provided that have components. Outer and inner component mounting members may engage each other with threads. Openings in the outer and inner members may be configured to engage component sidewalls and alignment tools.

17 Claims, 6 Drawing Sheets

US 8,369,702 B2

ELECTRONIC DEVICES WITH COMPONENT MOUNTING STRUCTURES

BACKGROUND

This relates generally to electronic devices, and, more particularly, to electronic device component mounting features that enhance the performance of electronic devices.

Electronic devices include components such as cameras. These components are typically mounted to housing structures.

Electronic devices with features such as these may have shortcomings. For example, component mounting structures in existing devices may not be robust or compact enough.

It would therefore be desirable to be able to provide improved electronic device structures.

SUMMARY

Electronic devices may be provided that have electrical components such as camera modules. A component support structure may be formed for supporting an electrical component. The component support structure may have threaded outer and inner members. The outer member may lie on one side of a housing wall and the inner member may lie on the other side of the housing wall. The outer and inner members may be screwed together through an opening in the housing wall. Openings in the outer and inner members may be configured to engage component sidewalls and alignment tools. The opening in the outer member may be hexagonal. The opening in the inner member may be rectangular to engage a component such as a camera module having a rectangular outline.

Further features of the invention, its nature and various advantages will be more apparent from the accompanying drawings and the following detailed description of the preferred embodiments.

DETAILED DESCRIPTION

Figure 1:
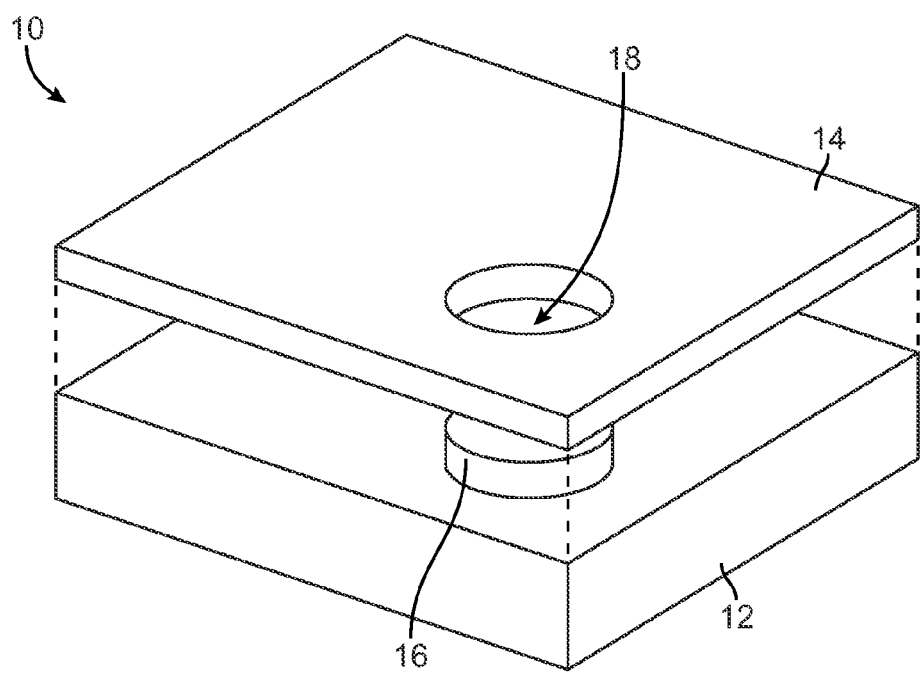
FIG. 1 is a perspective view of an illustrative electronic device of the type that may be provided with component mounting structures such as low profile camera mounting structures in accordance with an embodiment of the present invention.

A perspective view of an illustrative device that may be provided with component mounting structures is shown in FIG. 1. Device 10 may be a media player, a cellular telephone, a computer, or other suitable electronic device. Device 10 may have a main housing body such as body 12. Main housing body 12 may have housing structures formed from material such as plastic, metal, carbon fiber or other composites, ceramic, glass, other suitable materials, or combination of these materials. The housing for device 10 may be formed from multiple structures or may be formed using a unibody configuration in which the housing is formed from a single piece of machined or cast metal or other suitable material.

As shown in FIG. 1, device 10 may include structure 14. Structure 14 may be a clip, a cover, a transparent member that serves as a cover for a display, or other suitable structure. Structure 14 may be attached to main body 12 of device 10 using a hinge such as a spring-loaded hinge, magnets, or other suitable attachment mechanisms. During operation of device 10, structures 14 may move relative to main body 12 (e.g., on a hinge).

Structure 14 may be formed from a planar member that has an opening such as opening 18. Opening 18 may be a circular hole that passes through structure 14 or may have other shapes. Component mounting structure 16 may protrude from the surface of housing body 12. With one suitable arrangement, component mounting structure 16 may have a cylindrical shape with a longitudinal axis that runs through the center of circular opening 18 (i.e., component mounting structure 16 may be aligned with opening 18). Component mounting structure 16 may be flush with structure 14 or may be shorter or taller than structure 14 if desired.

Figure 2:
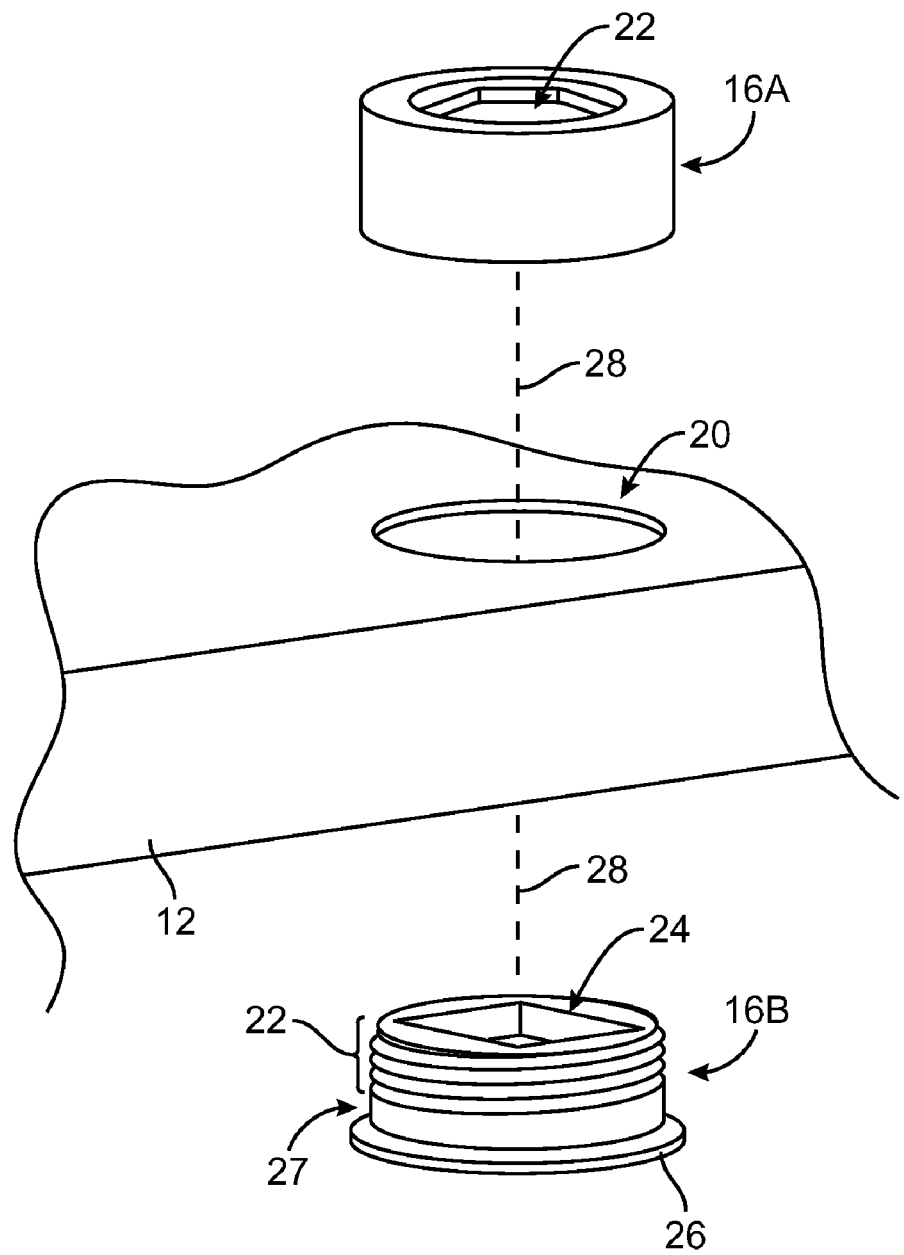
FIG. 2 is an exploded perspective view of an illustrative component mounting structure and an associated portion of an electronic device housing body in accordance with an embodiment of the present invention.

Component mounting structure 16 may be formed using outer and inner members. As shown in the exploded perspective view of FIG. 2, component mounting structure 16 may include outer member 16A and inner member 16B. Outer member 16A and inner member 16B may be aligned along axis 28 with opening 20 in the wall of body 12. Inner member 16B may have threads 22 that mate with corresponding threads in outer member 16A. Retainer flange portion 26 on inner member 16B may bear against the inner surface of the upper wall of body 12 when members 16A and 16B are screwed together. In this configuration, outer member 16A lies above the surface of housing 12, whereas at least some of member 15B (i.e., flange 26) lies below the surface of housing 12 and at least some of member 15B (i.e., threads 22) lies above the surface of housing 12. Notch 27 may be provided in retainer flange 26 to accommodate a flex circuit that is attached to a component mounted in hole 24.

Figure 3:
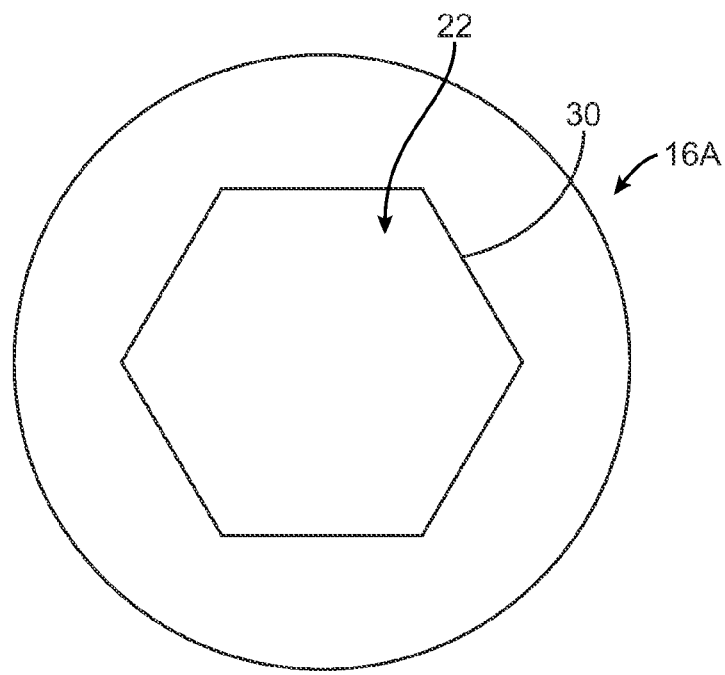
FIG. 3 is a top view of an illustrative outer member in a component mounting structure of the type shown in FIG. 2 in accordance with an embodiment of the present invention.

As shown in the top view of outer member 16A in FIG. 3, opening 22 may have a shape that allows the rotational position of member 16A about axis 28 (FIG. 2) to be controlled during assembly. In the FIG. 3 example, opening 22 has a hexagonal inner periphery (inner periphery 30). This allows a hexagonal tool to engage member 16A. Other shapes that allow tools to engage member 16A may be used if desired (e.g., polygons, shapes with curved and straight sides, etc.).

Figure 4:
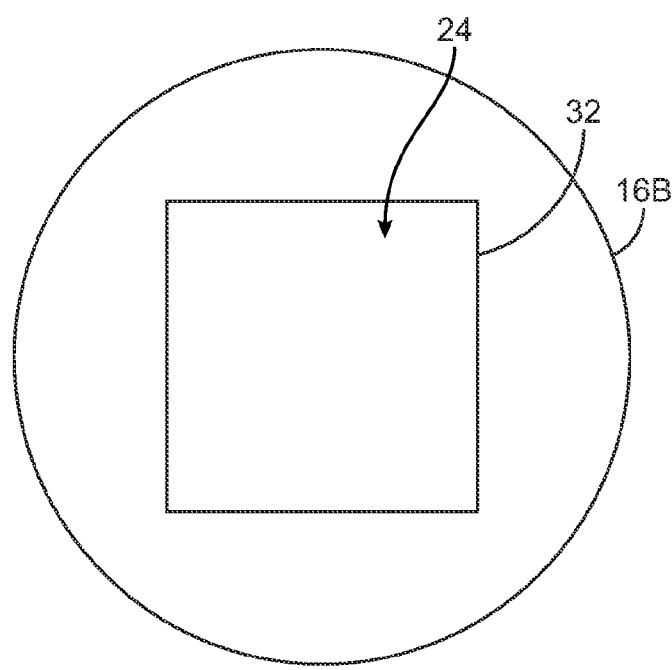
FIG. 4 is a top view of an illustrative inner member in a component mounting structure of the type shown in FIG. 2 in accordance with an embodiment of the present invention.

As shown in the top view of inner member 16B in FIG. 4, opening 24 in inner member 16B may a square shape such as square inner periphery 32. Square openings such opening 24 may accommodate components with rectangular (e.g., square) outlines. As an example, square opening 24 may be used to receive a rectangular camera module. When the camera module is received within square opening 24, the straight sides of opening 24 serve as alignment features that can help hold the camera module in a desired position and can prevent unintended rotational movement of the camera module. The mounting of a camera module using this type of arrangement is merely illustrative. Other types of components may be mounted in member 16B if desired. Moreover, opening 24 may have non-rectangular shapes (e.g., other polygonal shapes, shapes with curved and straight sides, circles with alignment notches, other types of shapes such as shapes with other alignment features, etc.).

Figure 5:
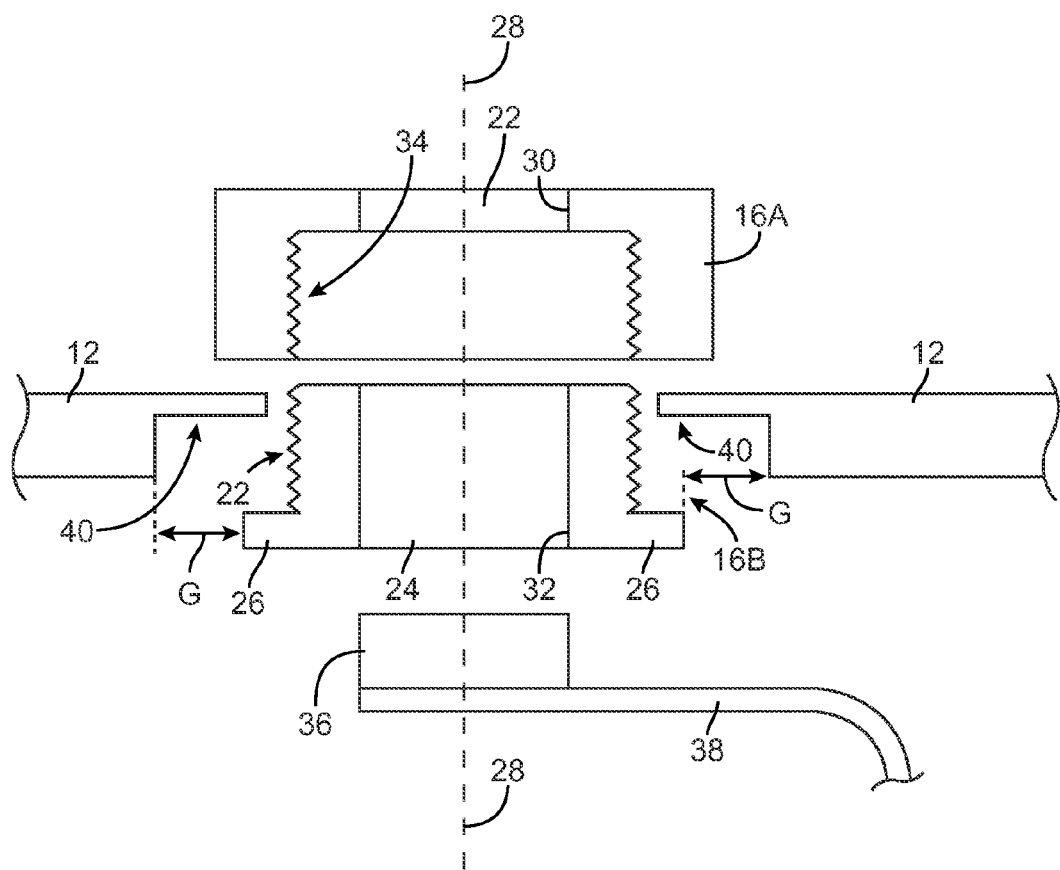
FIG. 5 is an exploded cross-sectional side view of a portion of an electronic device in which a component such as a camera module is mounted in accordance with an embodiment of the present invention.

An exploded cross-sectional side view of a portion of device 10 showing how a component such as electrical component 36 may be mounted within square opening 24 of inner member 16B is shown in FIG. 5. Component 36 may be a camera module having a flex circuit pigtail such as flex circuit 38. Camera module 36 may have a rectangular (cube-shaped) housing with a rectangular (e.g., square) outline when viewed along axis 28. The square outline of camera module 36 may mate with the square opening shape of opening 24, thereby preventing camera module 36 from rotating relative to member 16B.

During assembly, threads 22 of member 16B may engage threads 34 of member 16A. Lower member 16B may be held in a desired rotational alignment with respect to housing 12 to prevent undesired tilt. While holding lower member 16B in its desired position, member 16A may be rotated to screw members 16A and 16B together. This compresses members 16A and 16B towards each other along axis 28 (i.e., the longitudinal axis of members 16A and 16B). When compressed towards each other, flange 26 on member 16B may bear against housing 12 within recessed housing portions 40. Threads 22 may be coated with a thread-locking glue to facilitate permanent attachment of members 16B and 16A. To ensure that there is sufficient room to adjust the position of component mounting structure 16 on housing 12, a gap G may be provided between flange 26 and adjacent portions of housing 12.

Figure 6:
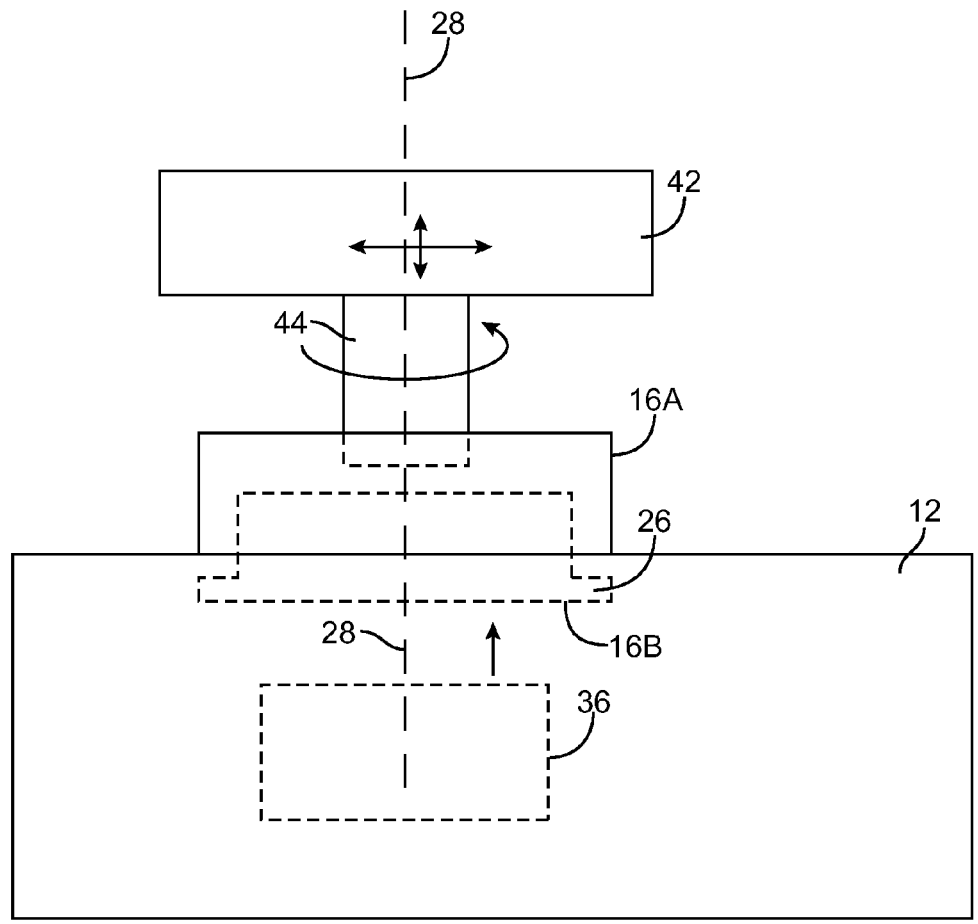
FIG. 6 is a cross-sectional side view of a portion of an electronic device showing how a tool may be used to assemble a component mounting structure having outer and inner members in accordance with an embodiment of the present invention.

FIG. 6 is a cross-sectional side view of a portion of device 10 showing how tool 42 may be used to screw outer member 16A and inner member 16B together. Tool 42 may have a shaft such as hexagonal shaft 44 that engages the hexagonal opening in outer member 16A. Tool 42 may use X-Y-Z positioning stages and a rotating positioner to position members 16A and 16B in desired locations and to rotate outer member 16A when screwing members 16A and 16B together. When attaching members 16A and 16B in this way to housing 12, the angular (tilt) alignment of opening 24 in inner member 16B can be controlled (e.g., with a tool that engages opening 24). This may help ensure that camera module 36 is not tilted relative to housing 12A when assembly is complete so that images that are acquired with the image sensor within camera module 36 are not tilted.

Figure 7:
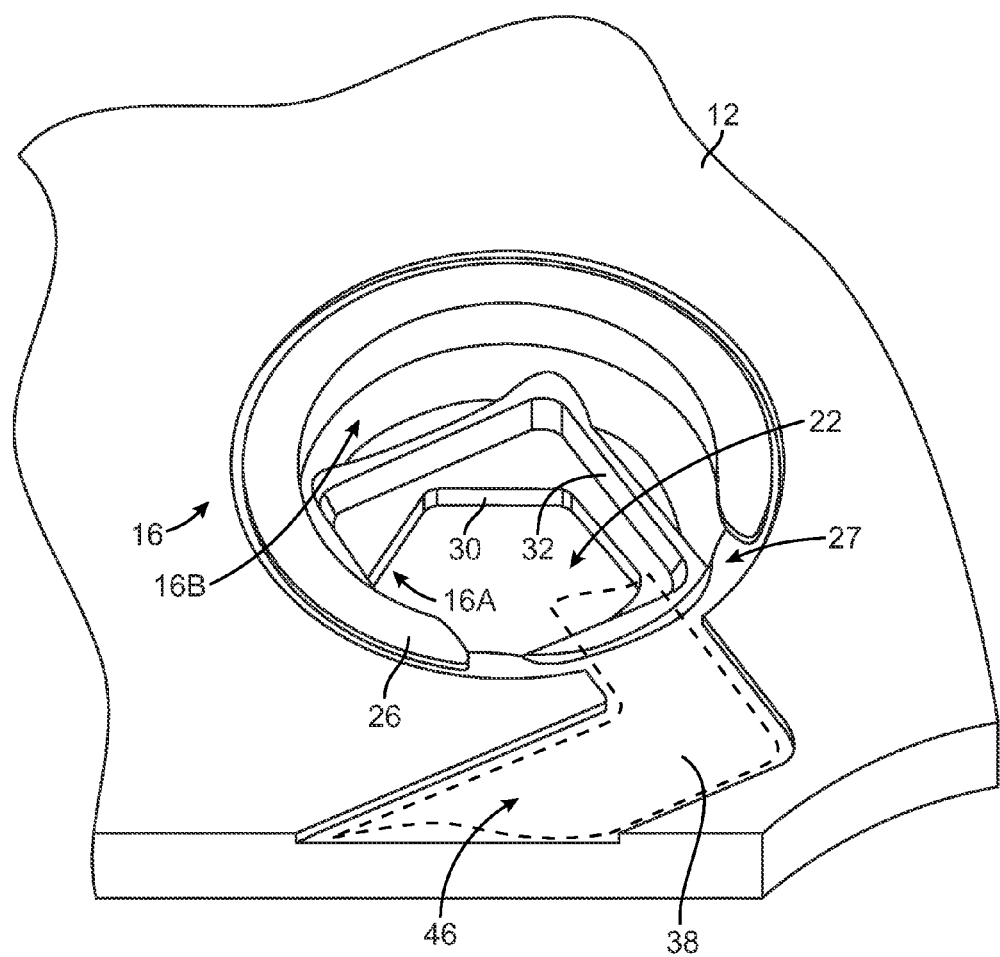
FIG. 7 is a perspective interior view of component mounting structures attached to a portion of a device housing in accordance with an embodiment of the present invention.

A perspective view of component mounting structure 16 as viewed from the interior of housing 12 is shown in FIG. 7. As shown in FIG. 7, housing 12 may have a recessed portion such as groove 46 and retainer flange portion 26 of inner member 16B may have a notch such as notch 27 to accommodate flex circuit 38 (FIG. 5). As shown in FIG. 7, flex circuit 38 may pass through notch 27 to groove 46.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a housing having a housing wall with an opening;
   an electrical component; and
   component mounting structures that mount the electrical component at the opening in the housing wall, wherein the component mounting structures comprise an outer member that is located on an outside surface of the housing wall and an inner member that is connected to the outer member and that has portions located on an inside surface of the housing wall, wherein the inner member has an opening with alignment features that mate with the electrical component, wherein the electronic device is an electronic device selected from the group consisting of: a media player, a cellular telephone, and a computer, and wherein the electrical component comprises a camera module.

2. The electronic device defined in claim 1 wherein the electrical component has a rectangular outline and wherein the alignment features of the inner member have a rectangular inner periphery that mates with the rectangular outline.

3. The electronic device defined in claim 2 wherein the outer member and the inner member have threads and wherein the outer member and the inner member are screwed together.

4. The electronic device defined in claim 3 wherein the outer member has an opening with at least one straight side.

5. The electronic device defined in claim 4 wherein the opening of the outer member has a hexagonal shape.

6. The electronic device defined in claim 2 further comprising a planar member with a hole that is aligned with the component mounting structures so that the camera module receives light through the hole.

7. The electronic device defined in claim 6 wherein the housing wall separates an interior region of the electronic device from an exterior region of the electronic device and wherein the planar member is located within the exterior region.

8. The electronic device defined in claim 1 further comprising a planar member with a hole that is aligned with the component mounting structures.

9. An electronic device, comprising:
   a housing having a housing wall with an opening;
   a camera module; and
   camera module mounting structures that mount the camera module at the opening in the housing wall, wherein the camera module mounting structures comprise an outer member that is located on an outside surface of the housing wall and an inner member that is connected to the outer member and that has portions located on an inside surface of the housing wall and wherein the inner member has a notch that is aligned with a groove in the housing wall.

10. The electronic device defined in claim 9 wherein the inner member has an opening with alignment features that mate with the camera module.

11. The electronic device defined in claim 9 wherein the outer member and the inner member have threads and wherein the outer member and the inner member are screwed together.

12. The electronic device defined in claim 11 wherein the outer member has an opening with at least one straight side.

13. The electronic device defined in claim 11 further comprising a planar member with a hole that is aligned with the component mounting structures so that the camera module receives light through the hole.

14. Apparatus comprising:
   a housing structure with an opening;
   an electrical component;
   component mounting structures that mount the electrical component at the opening in the housing structure, wherein the component mounting structures comprise an outer member that is located on an outside surface of the housing structure and an inner member that is connected to the outer member and that has portions located on an inside surface of the housing structure and wherein the inner member has an opening with alignment features that mate with the electrical component; and a flex circuit connected to the electrical component, wherein the housing structure has portions that define a recessed groove in the inside surface and wherein the recessed groove receives the flex circuit.

15. The apparatus defined in claim 14 wherein the inner member has portions that extend from the inside surface to the outside surface through the opening in the housing structure.

16. The apparatus defined in claim 15 wherein the opening of the housing structure has a diameter, wherein the inner member has portions that define a retaining flange that prevents the inner member from moving through the opening towards the outside surface, and wherein the retaining flange extends over portions of the inside surface.

17. The apparatus defined in claim 14 wherein the retaining flange has a notch that is aligned with the groove and wherein the flex circuit passes through the notch to the groove.

\* \* \* \* \*